United States Patent
Grochowski et al.

(10) Patent No.: US 8,447,458 B2
(45) Date of Patent: May 21, 2013

(54) SECONDARY STEERING TEST METHOD

(75) Inventors: Dustin R. Grochowski, Dubuque, IA (US); Francois Stander, Dubuque, IA (US); Carl R. Starkey, Dubuque, IA (US)

(73) Assignee: Deere & Company, Moline, IL (US)

( * ) Notice: Subject to any disclaimer, the term of this patent is extended or adjusted under 35 U.S.C. 154(b) by 311 days.

(21) Appl. No.: 13/027,339

(22) Filed: Feb. 15, 2011

(65) Prior Publication Data

US 2012/0209469 A1    Aug. 16, 2012

(51) Int. Cl.
*G06F 19/00* (2006.01)
(52) U.S. Cl.
USPC .............. 701/29.1; 701/41; 701/29.6; 701/43
(58) Field of Classification Search
USPC ........... 701/29.1, 29.2, 29.6, 41, 43; 180/419, 180/422, 417, 441, 442
See application file for complete search history.

(56) References Cited

U.S. PATENT DOCUMENTS

| | | | |
|---|---|---|---|
| 8,235,163 B2 * | 8/2012 | Webert et al. | 180/442 |
| 2011/0029201 A1 * | 2/2011 | Holt et al. | 701/41 |
| 2011/0264321 A1 * | 10/2011 | Offerle et al. | 701/29 |

* cited by examiner

*Primary Examiner* — Richard M. Camby
(74) *Attorney, Agent, or Firm* — Taylor IP, P.C.

(57) ABSTRACT

A method to evaluate a secondary steering system including the steps of lowering the first hydraulic fluid pressure, determining the first hydraulic fluid pressure, sensing a second hydraulic fluid pressure, and comparing the first hydraulic fluid pressure to the second hydraulic fluid pressure. The lowering step includes lowering the first hydraulic fluid pressure provided by the primary steering system power source while the vehicle is traveling at a substantially predetermined speed. The sensing step includes sensing the second hydraulic fluid pressure provided by the secondary steering system power source while an operator of the vehicle is steering the vehicle as the vehicle travels at the predetermined speed. The comparing step includes comparing the first hydraulic fluid pressure to the second hydraulic fluid pressure to determine if the second steering system power source provided fluid to steer the ground-engaging device.

20 Claims, 5 Drawing Sheets

SECONDARY STEERING TEST METHOD

FIELD OF THE INVENTION

The present invention relates to a secondary steering test method for a vehicle, and, more particularly, to a secondary steering system testing method for a vehicle that is performed in the operating environment.

BACKGROUND OF THE INVENTION

Steering is a term applied to a collection of components, linkages, and systems to allow a vehicle to be directed to follow a desired course. The basic aim of steering is to ensure that the wheels are directed to a desired position. This is generally achieved by a series of linkages, rods, pivots, gears, hydraulic systems, etc.

Many vehicles use a rack and pinion steering mechanism where a steering wheel turns the pinion gear and a pinion moves the rack, which is a linear gear that meshes with the pinion, converting circular motion into linear motion along the transverse axis of the vehicle. This motion applies steering torque to ball joints that are connected to tie rods and a short lever arm called the steering gear.

A hydraulic power steering system uses hydraulic pressure supplied by a pump to assist in the motion of turning the steering wheel. There are also electrical power steering systems to assist in the steering of the vehicle.

Four-wheel steering, on some vehicles, is utilized to improve steering response, increase the vehicle stability while maneuvering at high speed and/or to decrease turning radius at low speed. In most active four-wheel steering systems, the rear wheels are steered by a controller and actuators. The rear wheels generally cannot turn as far as the front wheels in most systems. Some vehicles utilize what is called a passive steering system to correct for the rear wheel tendency to toe-out. The passive steering system utilizes lateral forces generated in a turn, through the suspension geometry, to correct the tendency and to steer the rear wheels slightly to the inside of the corner.

Some vehicles utilize rear wheel steering, such as some forklift trucks and some other construction equipment. In many construction vehicles, steering is done by a hydraulic system that is activated by the steering wheel, causing the steered wheels to turn based on hydraulic pressure supplied thereto. Some systems are referred to as steer-by-wire, with the aim of this technology to do away with as many mechanical components, such as a steering shaft, steering column, gear reduction mechanisms, etc. Steering systems that utilize hydraulic power to either assist or to completely control the steering of a vehicle utilize pressurized hydraulic fluid supplied by an engine-driven pump. For many systems, a secondary steering system is also provided to utilize the forward momentum of the vehicle to supply a secondary source of pressurized hydraulic fluid to the system in the event that the primary system ceases to function. For example, if the engine were to cease operation for some reason, steering power is still available as the forward momentum of the machine provides the pressurized hydraulic fluid for the steering system.

The testing of the secondary and primary steering systems can be done in a test stand environment where the systems are activated, deactivated, and checked for functioning using the connections and interaction of the test stand. Another method utilizes a system in which the engine is shut off during operation to see if the secondary system is functioning. This sort of test has several disadvantages in that the engine power is not available and requires the bypassing of safety systems in order to test the secondary system.

What is needed in the art is a secondary steering system test that can be conducted without bypassing safety criteria built into a vehicle's operating system and without the need for a specialized test stand.

SUMMARY

The present invention provides a secondary steering system test, and, more particularly, a secondary steering system test for a vehicle in an operating environment.

The invention in one form is directed to a vehicle having a ground-engaging device, a primary steering system power source, a secondary steering system power source, and a controller. The primary steering system power source is configured to provide steering power to the ground-engaging device. The secondary steering system power source is also configured to provide steering power to the ground-engaging device. The controller is communicatively coupled to the primary steering system power source and the secondary steering system power source. The controller is configured to execute steps of a method to evaluate the secondary steering system power source. The method executed by the controller includes the steps of lowering the first hydraulic fluid pressure, determining the first hydraulic fluid pressure, sensing a second hydraulic fluid pressure, and comparing the first hydraulic fluid pressure to the second hydraulic fluid pressure. The lowering step includes lowering the first hydraulic fluid pressure provided by the primary steering system power source while the vehicle is traveling at a substantially predetermined speed. The sensing step includes sensing the second hydraulic fluid pressure provided by the secondary steering system power source while an operator of the vehicle is steering the vehicle as the vehicle travels at the predetermined speed. The comparing step includes comparing the first hydraulic fluid pressure to the second hydraulic fluid pressure to determine if the second steering system power source provided fluid to steer the ground-engaging device.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplifications set out herein illustrate one embodiment of the invention and such exemplifications are not to be construed as limiting the scope of the invention in any manner.

DETAILED DESCRIPTION

Figure 1:
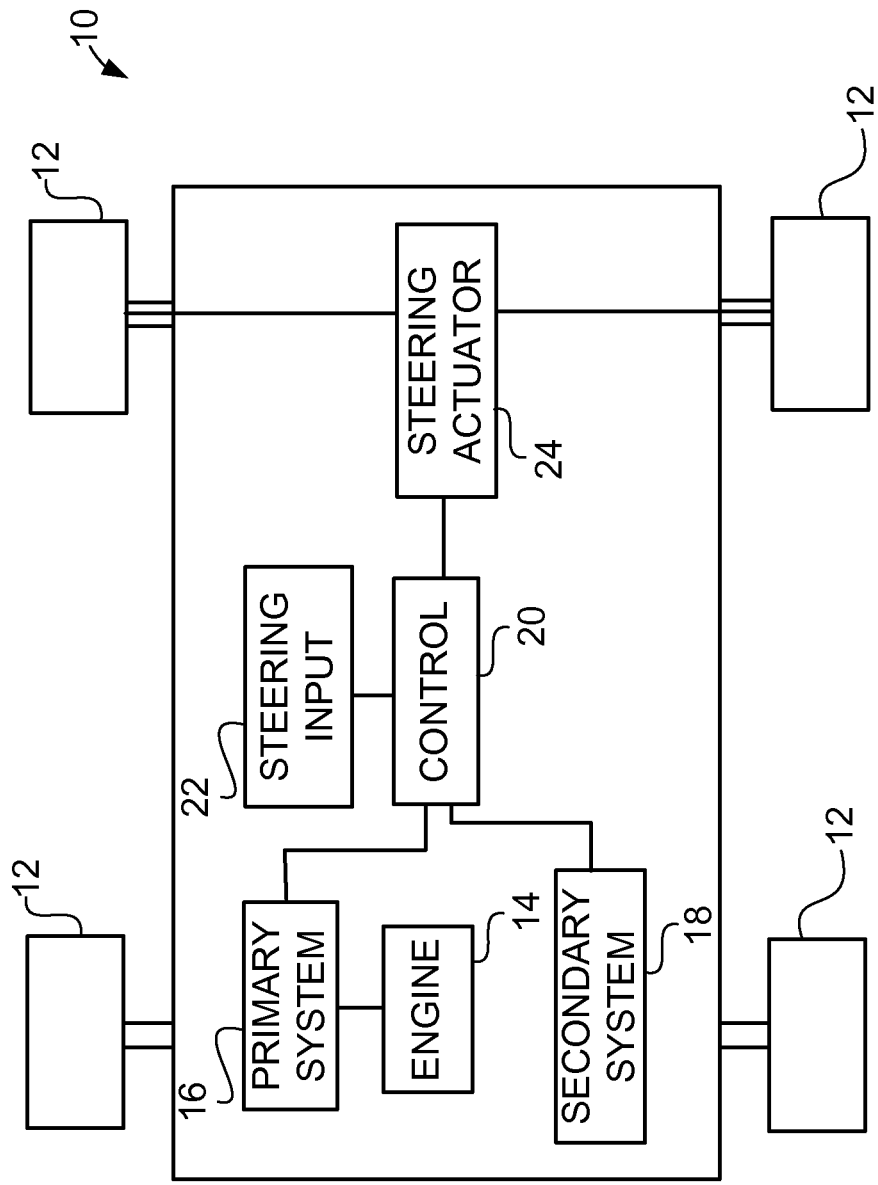
FIG. 1 is a schematical illustration of a vehicle incorporating an embodiment of the steering system test method of the present invention.

Referring now to the drawings, and more particularly to FIG. 1, there is illustrated, in a schematical fashion, a vehicle 10 having ground-engaging devices 12, an engine 14, a primary steering system power source 16, a secondary steering system power source 18, a controller 20, a steering input 22, and steering actuators 24. Vehicle 10 may be in the form of an articulated vehicle or other ground-engaging vehicle utilized for construction, agricultural, forestry, mining, and other related vehicles that have primary and secondary steering systems. Ground-engaging devices 12 may be wheels, tracks, or other devices allowing vehicle 10 to proceed over the ground. Although illustrated as wheels 12 that are being steered, other forms of steering, including an articulated vehicle, are anticipated and steering actuators 24 refer generally to those actuators, which are utilized in steering vehicle 10. Engine 14 may be an internal combustion engine in the form of a diesel engine providing power to various functions of vehicle 10 including driving a hydraulic pump that is a part of primary steering system power source 16.

Primary steering system power source 16 provides hydraulic pressure and fluid flow under the direction of controller 20 to steering actuators 24 as directed by information from steering input 22. Primary steering system power source 16 may also provide hydraulic fluid pressure and flow for other functions not discussed herein.

Secondary steering system power source 18 is driven by a mechanical linkage by way of a connection to at least one ground-engaging device 12. The forward movement of vehicle 10 provides a driving force to the pump in secondary system power source 18 so that when vehicle 10 is moving, an alternate source of pressurized hydraulic fluid flow is available in the event that primary steering system power source 16 fails or provides inadequate pressure. Controller 20, which may be a combination of hydraulic and electrical elements, receives steering information from steering input 22, which may be in the form of a steering wheel or joystick, etc. Controller 20 utilizes steering information and directs hydraulic pressure appropriately to steering actuators 24 to steer ground-engaging devices 12. It is understood that controller 20 may actually be integral with some other portion of vehicle 10, including steering actuators 24, so that steering information provided by steering input 22 is then expressed in the steering of vehicle 10. For the sake of clarity, steering actuators 24 can be considered to be hydraulic cylinders that effect the steering of vehicle 10 and can be the steering of all or some of the ground-engaging devices 12 or by articulated movement of vehicle 10 or by a combination thereof.

Figure 2:
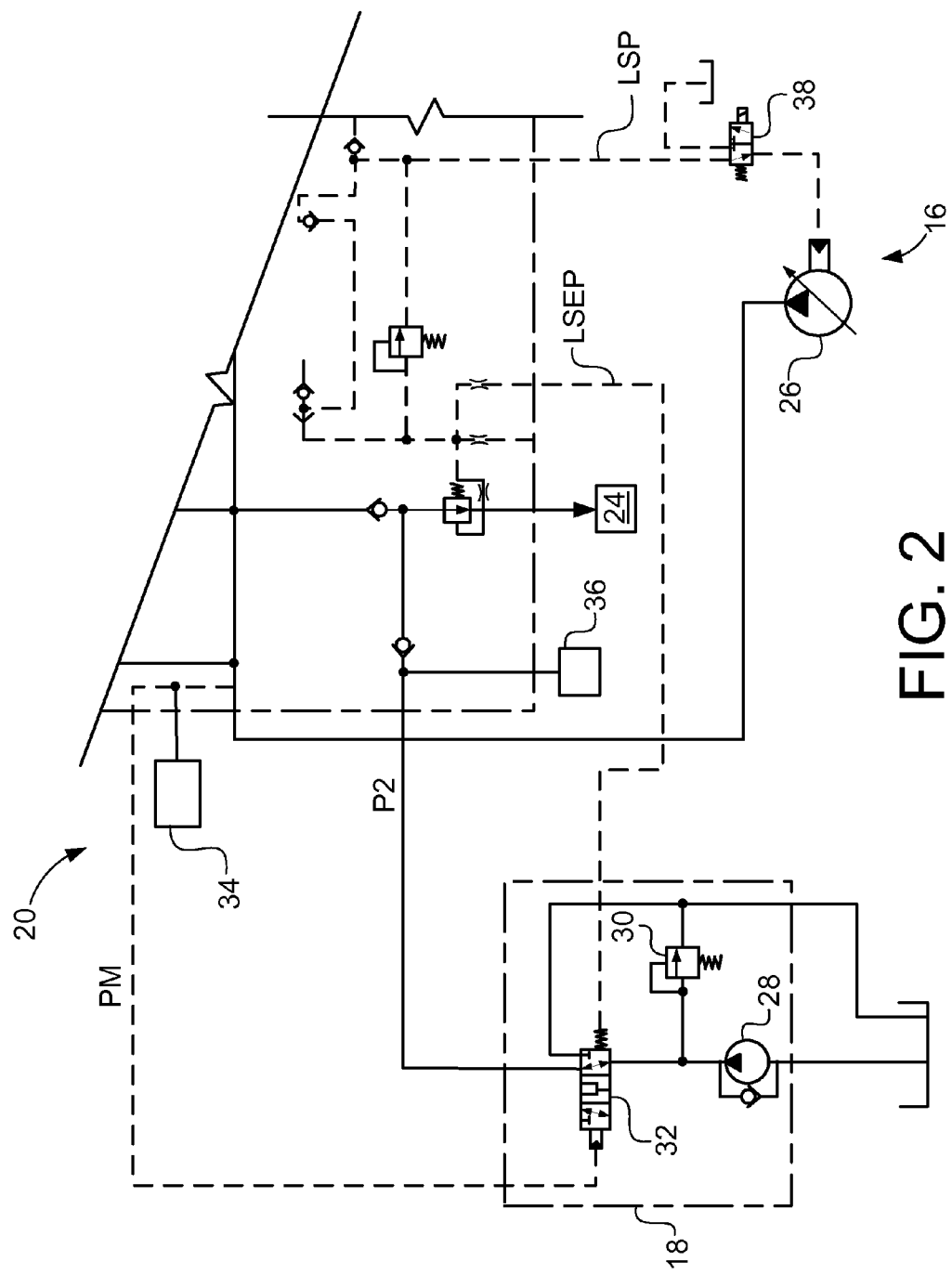
FIG. 2 is a schematic illustrating part of the control system utilized by the method of the present invention on the vehicle of FIG. 1.

Now, additionally referring to FIG. 2, there is illustrated a portion of controller 20 with some relevant circuits connected for the purposes of illustrating the function of the primary and secondary steering system power sources 16 and 18 and how the testing of secondary steering system power source 18 is undertaken. Primary steering system power source 16 includes a primary pump 26 that is driven by engine 14. Primary pump 26 supplies pressurized hydraulic fluid to controller 20. Secondary steering system power source 18 includes a secondary pump 28 that is driven by a ground-engaging device 12 by way of mechanical linkages therebetween. Pressure regulator 30 and a pressure switch valve 32 are also illustrated. Pressure regulator 30 provides for a release of hydraulic fluid in the event the pressure generated by secondary pump 28 exceeds a predetermined value, such as 200 bar. Pressure switch valve 32 monitors the pressure difference between primary pump 26 and the load sense line (LSEP), and in the event that the pressure difference falls below a predetermined value, such as 10 bar, pressure switch valve 32 is activated and moved to the position as shown in FIG. 2, causing the fluid flow from secondary pump 28 to supply hydraulic fluid flow to controller 20. If the difference between the primary pump 26, and the pressure requirement from the steering system as communicated through LSEP is 10 bar or more, then pressure switch valve 32 directs the fluid flow from secondary pump 28 back to the reservoir, and controller 20 utilizes hydraulic fluid flow from primary pump 26. A transducer 34 is connected into the pressure supply line from pump 26 by way of primary manifold PM to monitor the pressure for purposes of the testing method described herein. A pressure transducer 36 is connected to the supply line P2 from pump 28 for monitoring of the pressure of secondary steering system power source 18. A signal from the load sense line (LSEP) is sent to valve 32 that reflects the amount of pressure that the steering valve needs to continue to function properly. The primary manifold PM line sends a signal to the secondary steering manifold that reflects the amount of pressure primary pump 26 is currently providing. If, at any time, the LSEP signal becomes within 10 bar of the PM signal, valve 32 will change position, causing secondary steering system power source 18 to be active and pressure to be applied to the main manifold steering circuit by way of line P2.

During the secondary steering test, the artificial situation of pump 26 not supplying fluid is created by cutting the load sense signal (LSP) to primary pump 26. This is done by actuating valve 38 between the LSP line and primary pump 26. This causes the LSP from the main manifold to be blocked with the fluid of load sense signal (LSP) being sent to the reservoir tank. If primary pump 26 doesn't see a load sense signal LSP, it provide a minimal pressure, so that valve 32 activates when a steering command is given, causing secondary pump 28 to provide pressurized hydraulic fluid flow to controller 20. This condition is then verified by transducers 34 and 36 and vehicle 10 will continue to be able to steer utilizing fluid flow from secondary pump 28.

Figure 3A:
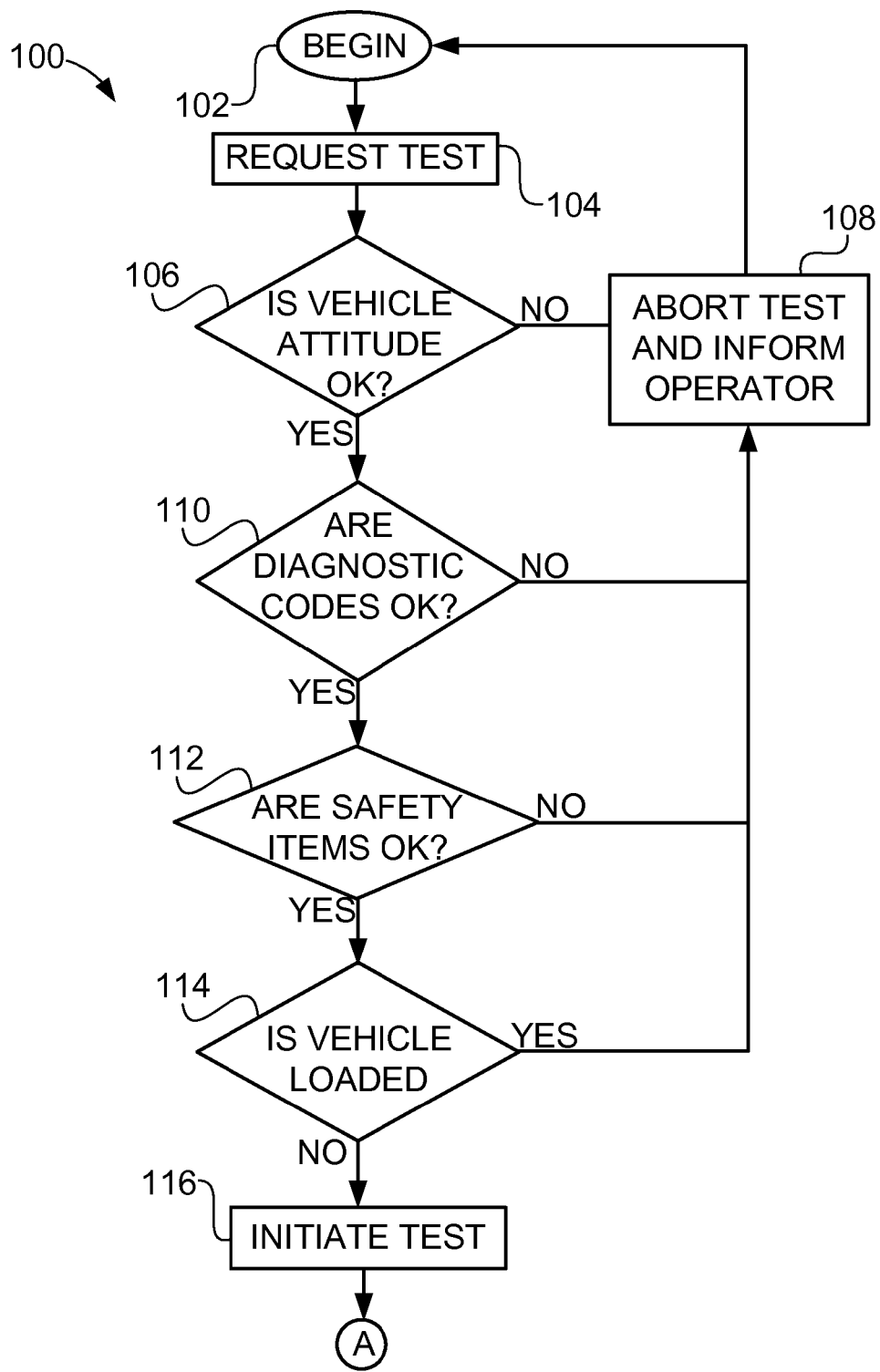
FIGS. 3A through 3C are a schematical flowchart illustrating the steps of an embodiment of the method of the present invention utilized with the vehicle of FIG. 1 and the control system of FIG. 2.
Figure 3B:
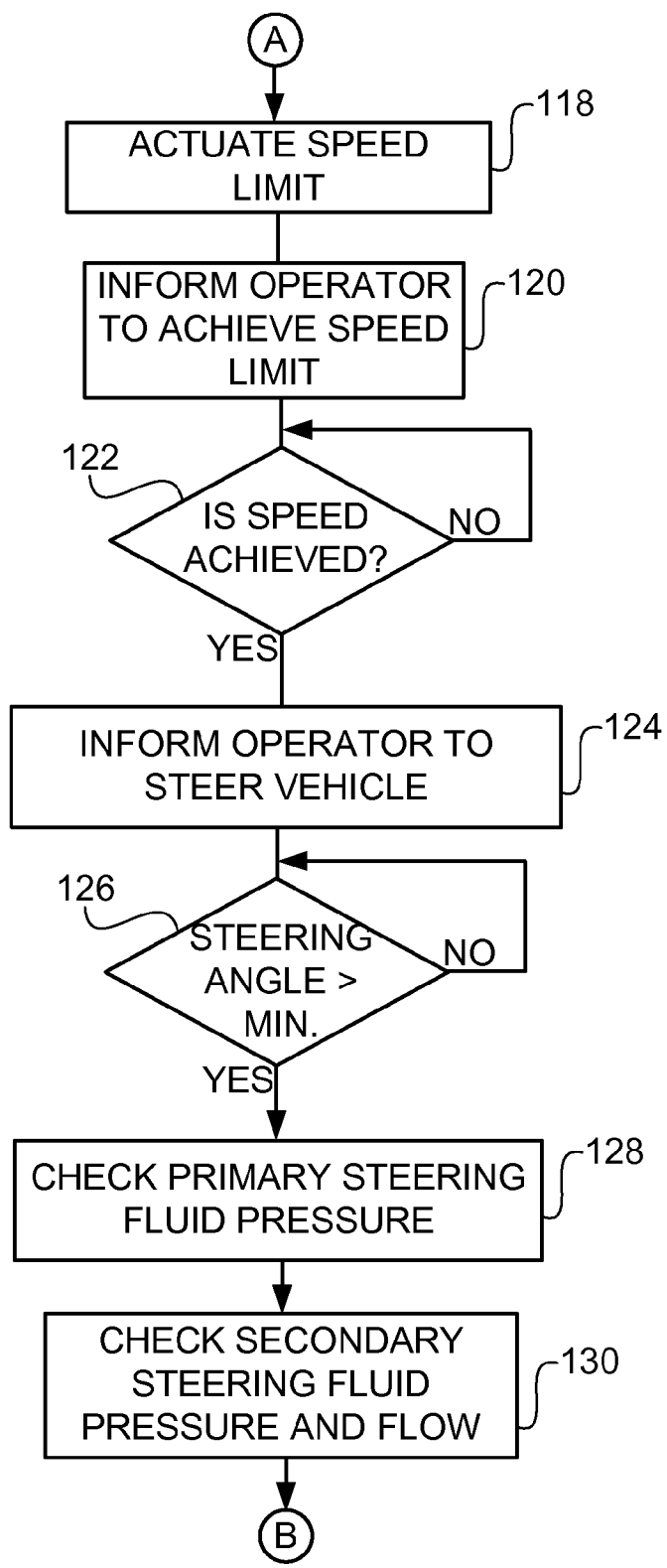
Figure 3C:
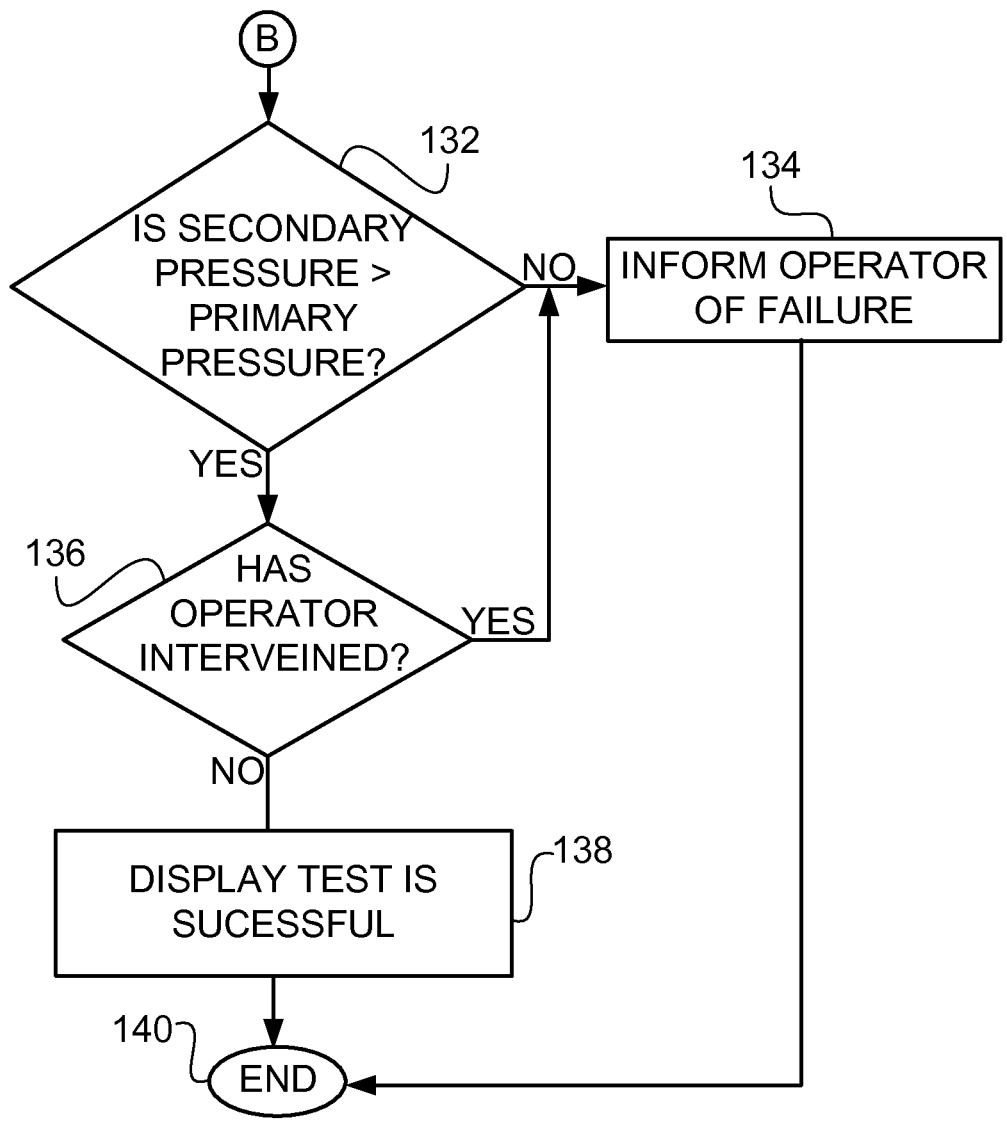

Now, additionally referring to FIG. 3, there is illustrated a flowchart that outlines steps that can be utilized in the carrying out of inventive method 100. Method 100 begins at step 102 and, when a test is requested at step 104, several items are checked to see if the vehicle is in condition for carrying out the test. First, a check of the vehicle attitude is undertaken to ensure that vehicle 10 is on substantially level ground at step 106. If the vehicle is not on a substantially level ground, then the test aborts at step 108 and information is provided to the operator that the test cannot be carried out until the vehicle attitude is corrected. At step 110, a check is undertaken to ensure that vehicle 10 is otherwise in working order by checking the diagnostic codes. If the diagnostic codes are not satisfactory, then the test is aborted and this condition is conveyed to the operator. If the diagnostic codes are OK, then, at step 112, it is checked to see if safety critical systems are in their proper state. The safety critical items include such items, for example, as results of a brake test, tire pressures being at acceptable levels, and the inner axle differential lock (IDL) being inactive. If the safety critical items are acceptable, then method 100 proceeds to step 114. If not, the operator is informed at step 108 of this condition and is requested to disengage the differential lock. At step 114, a check is undertaken to see if vehicle 10 is loaded. If vehicle 10 is loaded, then method 100 proceeds to step 108 and the test is aborted, informing the operator that the test needs to be undertaken with no load in the vehicle. This is to ensure that the test is preformed with the vehicle at substantially the same vehicle weight each time the test is performed. If the vehicle is not loaded, then the test initiates at step 116.

At step 116, pressure reduction of the fluid supplied by primary pump 26 is accomplished by activating valve 38. At step 118, controller 20 may actuate a speed limit limiting the speed at which the operator may operate vehicle 10 to a predetermined speed. At step 120, the operator is informed to achieve this predetermined speed, which may be 12 kilometers per hour. A check then is carried out at step 122 to see if the predetermined speed has been achieved for a predetermined time. The predetermined time required to ensure that the speed has been achieved may be, for example, two seconds. If the predetermined speed has been achieved, then method 100 proceeds to step 124 in which the operator is informed to steer the vehicle. Once the vehicle has been steered as requested in step 124, then at step 126, the steering angle is checked by way of an angular steering sensor to ensure that the operator has steered the vehicle sufficiently above a predetermined minimum angle, thereby confirming that the steering operation has been carried out.

At steps 128 and 130, the primary steering fluid pressure and the secondary fluid pressure are checked using transducers 34 and 36 and, even though these are shown as sequential steps, these two steps may be carried out during the execution of other steps, such as steps 116 through 138, to particularly ensure that the steering accomplished in steps 124 and 126 was carried out by fluid flow from secondary pump 28. At step 132, a check is undertaken to see that the secondary pressure was greater than the primary pressure during the functional aspects of the test. If the primary pressure was equal to or greater than the secondary pressure, then failure of the test is conveyed to the operator at step 134. Additionally, if the operator intervened at step 136 during the functioning of the steering test, such as application of a service brake or a parking brake, or if the accelerator is released at any stage during the test after the initial acceleration, then this information is conveyed to the operator at step 134 that the test has failed and may need to be restarted. If the operator did not intervene in the test and the secondary pressure was greater than the primary pressure as checked at step 132, then a message is displayed to the operator, at step 138, indicating that the test was successful and this data may be logged into a memory device for future analysis. The test ends at step 140 and primary pump 26 is reactivated by the de-energizing of valve 38, which causes valve 32 to shift so that secondary pump 28 is not supplying pressurized fluid and primary pump 26 is supplying pressurized fluid to controller 20.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A vehicle, comprising:
a ground-engaging device;
a primary steering system power source configured to provide power to steer said ground-engaging device;
a secondary steering system power source configured to provide power to steer said ground-engaging device; and
a controller communicatively coupled to at least one of said primary steering system power source and said secondary steering system power source, said controller being configured to execute steps of a method to evaluate said secondary steering system power source, the method including the steps of:
determining a first hydraulic fluid pressure provided by said primary steering system power source while the vehicle is traveling;
sensing a second hydraulic fluid pressure provided by said secondary steering system power source while an operator of the vehicle is steering the vehicle as the vehicle travels at substantially a predetermined speed; and
comparing said first hydraulic fluid pressure to said second hydraulic fluid pressure to determine if said secondary steering system power source provided fluid to steer said ground-engaging device.

2. The vehicle of claim 1, wherein said controller carries out said determining step at substantially the same time as said sensing step.

3. The vehicle of claim 2, wherein said sensing step additionally includes the step of measuring a flow of the hydraulic fluid through said secondary steering system power source while the steering of the vehicle is being accomplished, said flow also used to determine if said secondary steering system power source provided fluid flow to steer said ground-engaging device.

4. The vehicle of claim 3, wherein the method further comprises the step of verifying that at least a predetermined angle of steering movement is accomplished by the operator during said sensing step.

5. The vehicle of claim 1, wherein the method further comprises the step of determining if the operator intervened thereby causing the method to abort.

6. The vehicle of claim 1, wherein the method further comprises the step of checking preconditions prior to executing any of the other steps of the method and terminating the method if the preconditions are not met.

7. The vehicle of claim 1, wherein the method further comprises the step of lowering said first hydraulic fluid pressure provided by said primary steering system power source while the vehicle is traveling.

8. A steering system for a vehicle having a ground-engaging device, the steering system comprising:
a primary steering system power source configured to provide power to steer the ground-engaging device;
a secondary steering system power source configured to provide power to steer the ground-engaging device; and
a controller communicatively coupled to at least one of said primary steering system power source and said secondary steering system power source, said controller being configured to execute steps of a method to evaluate said secondary steering system power source, the method including the steps of:
determining a first hydraulic fluid pressure provided by said primary steering system power source while the vehicle is traveling;
sensing a second hydraulic fluid pressure provided by said secondary steering system power source while an operator of the vehicle is steering the vehicle as the vehicle travels at substantially a predetermined speed; and
comparing said first hydraulic fluid pressure to said second hydraulic fluid pressure to determine if said secondary steering system power source provided fluid to steer the ground-engaging device.

9. The steering system of claim 8, wherein said controller carries out said determining step at substantially the same time as said sensing step.

10. The steering system of claim 9, wherein said sensing step additionally includes the step of measuring a flow of the hydraulic fluid through said secondary steering system power source while the steering of the vehicle is being accomplished, said flow also used to determine if said secondary steering system power source provided fluid flow to steer said ground-engaging device.

11. The steering system of claim 10, wherein the method further comprises the step of verifying that at least a predetermined angle of steering movement is accomplished by the operator during said sensing step.

12. The steering system of claim 8, wherein the method further comprises the step of determining if the operator intervened thereby causing the method to abort.

13. The steering system of claim 8, wherein the method further comprises the step of checking preconditions prior to executing any of the other steps of the method and terminating the method if the preconditions are not met.

14. The steering system of claim 8, wherein the method further comprises the step of lowering said first hydraulic fluid pressure provided by said primary steering system power source while the vehicle is traveling.

15. A method of testing a steering system of a vehicle having a ground-engaging device, the method comprising the steps of:
determining a first hydraulic fluid pressure provided by a primary steering system power source while the vehicle is traveling;
sensing a second hydraulic fluid pressure provided by a secondary steering system power source while an operator of the vehicle is steering the vehicle as the vehicle travels at substantially a predetermined speed; and
comparing said first hydraulic fluid pressure to said second hydraulic fluid pressure to determine if said secondary steering system power source provided fluid to steer the ground-engaging device.

16. The method of claim 15, wherein said determining step is carried out at substantially the same time as said sensing step.

17. The method of claim 16, wherein said sensing step additionally includes the step of measuring a flow of the hydraulic fluid through said secondary steering system power source while the steering of the vehicle is being accomplished, said flow also used to determine if said secondary steering system power source provided fluid flow to steer said ground-engaging device.

18. The method of claim 17, further comprising the step of verifying that at least a predetermined angle of steering movement is accomplished by the operator during said sensing step.

19. The method of claim 15, further comprising the step of checking preconditions prior to executing any of the other steps of the method and terminating the method if the preconditions are not met.

20. The method of claim 15, further comprising the step of lowering said first hydraulic fluid pressure provided by said primary steering system power source while the vehicle is traveling.

* * * * *